United States Patent [19]

Ueda et al.

[11] Patent Number: 5,186,140

[45] Date of Patent: Feb. 16, 1993

[54] AIR INTAKE SYSTEM FOR FUEL INJECTION TYPE FOUR CYCLE ENGINE

[75] Inventors: Hideaki Ueda; Hiroshi Isumi, both of Shizuoka, Japan

[73] Assignee: Yamaha Hatsudoki Kabushiki Kaisha, Iwata, Japan

[21] Appl. No.: 837,825

[22] Filed: Feb. 18, 1992

[30] Foreign Application Priority Data

Mar. 15, 1991 [JP] Japan .................................. 3-76807

[51] Int. Cl.⁵ ............................................. F02B 31/02
[52] U.S. Cl. .................... 123/308; 123/432; 239/533.12
[58] Field of Search ............... 123/308, 432, 472, 302; 239/533.12

[56] References Cited

U.S. PATENT DOCUMENTS

| | | | |
|---|---|---|---|
| 4,617,896 | 10/1986 | Yoshikawa | 123/432 |
| 4,622,940 | 11/1986 | Yoshikawa | 123/432 |
| 4,627,400 | 12/1986 | Takata | 123/432 |
| 4,771,948 | 9/1988 | Furukawa | 239/533.12 |
| 4,773,374 | 9/1988 | Kiuchi | 239/533.12 |
| 4,805,569 | 2/1989 | Suzumara | 123/308 |
| 4,877,004 | 10/1989 | Nishizawa | 123/432 |
| 4,942,857 | 7/1990 | Yoshikawa | 123/308 |
| 4,986,478 | 1/1991 | Bertini | 239/533.12 |

FOREIGN PATENT DOCUMENTS

| | | |
|---|---|---|
| 62-212771 | 1/1987 | Japan . |
| 195572 | 12/1987 | Japan . |
| 1139079 | 3/1988 | Japan . |

*Primary Examiner*—E. Rollins Cross
*Assistant Examiner*—Erick Solis
*Attorney, Agent, or Firm*—Ernest A. Beutler

[57] ABSTRACT

A number of embodiments of these valve intake systems for internal combustion engines served by a siamese type intake passage and configured to generate a swirl in the intake charge. A single fuel injector sprays fuel into a common inlet opening of the siamese intake passage and sprays more fuel toward the swirl side port so as to insure equal flow through all of the ports.

30 Claims, 7 Drawing Sheets

5,186,140

AIR INTAKE SYSTEM FOR FUEL INJECTION TYPE FOUR CYCLE ENGINE

BACKGROUND OF THE INVENTION

This invention relates to a fuel injection type four cycle engine and more particularly to an intake system and fuel injection system for such an engine.

The advantages of multiple valve internal combustion engine are well known and such engines are becoming quite popular. The most typical type of multi-valve engine employed today incorporates four valves per cylinder, two intake and two exhaust. However, it has also been acknowledged that the performance of the engine can be further improved through the use of five valve cylinder heads embodying three intake valves and two exhaust valves. However, when the number of intake valves is multiplied above two, there can be certain complexities with the combustion chamber and the porting arrangement for it.

Frequently port type fuel injection is employed with such engines and it is desireable to incorporate a system that does not require a fuel injector for each valve seat of a three valve engine. Although it is relatively simple to employ a single injector for two intake valves, when this principal is implied to three intake valves certain problems arise.

This is particularly true since three valve engines permit the different configurations of the intake porting so as to achieve some form of swirl in the combustion chamber but not so much swirl that the high speed volumetric efficiency of the engine is deteriorated. However, where there are such unequal flows through the intake passages, particularly at low speeds, certain problems arise if attempts are made to employ a single fuel injector. That is, the fuel/air distribution in the cylinder may not be as uniform as desired.

It is, therefore, a principal object to this invention to provide an improved injection and porting arrangement for a multiple valve engine having a siamese type porting system and wherein a single fuel injector supplies fuel substantially equally to all intake ports.

It is a further object to this invention to provide an induction system for a multiple valve engine having at least three valves per cylinder and wherein the flow through the intake valves is not equal under all running conditions so as to achieve some swirling motion in the intake passage and still have equal fuel distribution through the use of a single fuel injector.

One way in which the unequal flow patterns can be achieved is by having a siamese type intake passage serving three intake valves with one of the passages being longer than the other so as to import a higher velocity and swirl to the intake charge. However, where this is done, if the fuel injector is disposed so as to spray fuel into the intake passage at a common portion, the longer passage may receive less fuel than the other passages.

It is, therefore, a still further object to this invention to provide an improved arrangement for insuring equal fuel distribution through a multiple valve internal combustion engine incorporating a single fuel injector per cylinder.

SUMMARY OF THE INVENTION

This invention is adapted to be embodied in an induction system for an internal combustion engine having a combustion chamber with three intake ports serving the combustion chamber. The intake ports are comprised of a center intake port, and first and second side intake ports lying on opposite sides of the center intake port. Intake passage means have a common portion separated into three outlet portions comprised of a center outlet portion and a pair of side outlet portions each serving a respective one of the intake ports. The first of the side intake portions is longer than the other of the side intake portions. A fuel injector sprays fuel into the common portion of the intake passage means toward the outlet portions. The fuel injector is disposed to spray more fuel toward the first side portion than the second side portion to insure equal flow through all portions.

DETAILED DESCRIPTION OF THE PREFERRED EMBODIMENTS OF THE INVENTION

Figure 1:
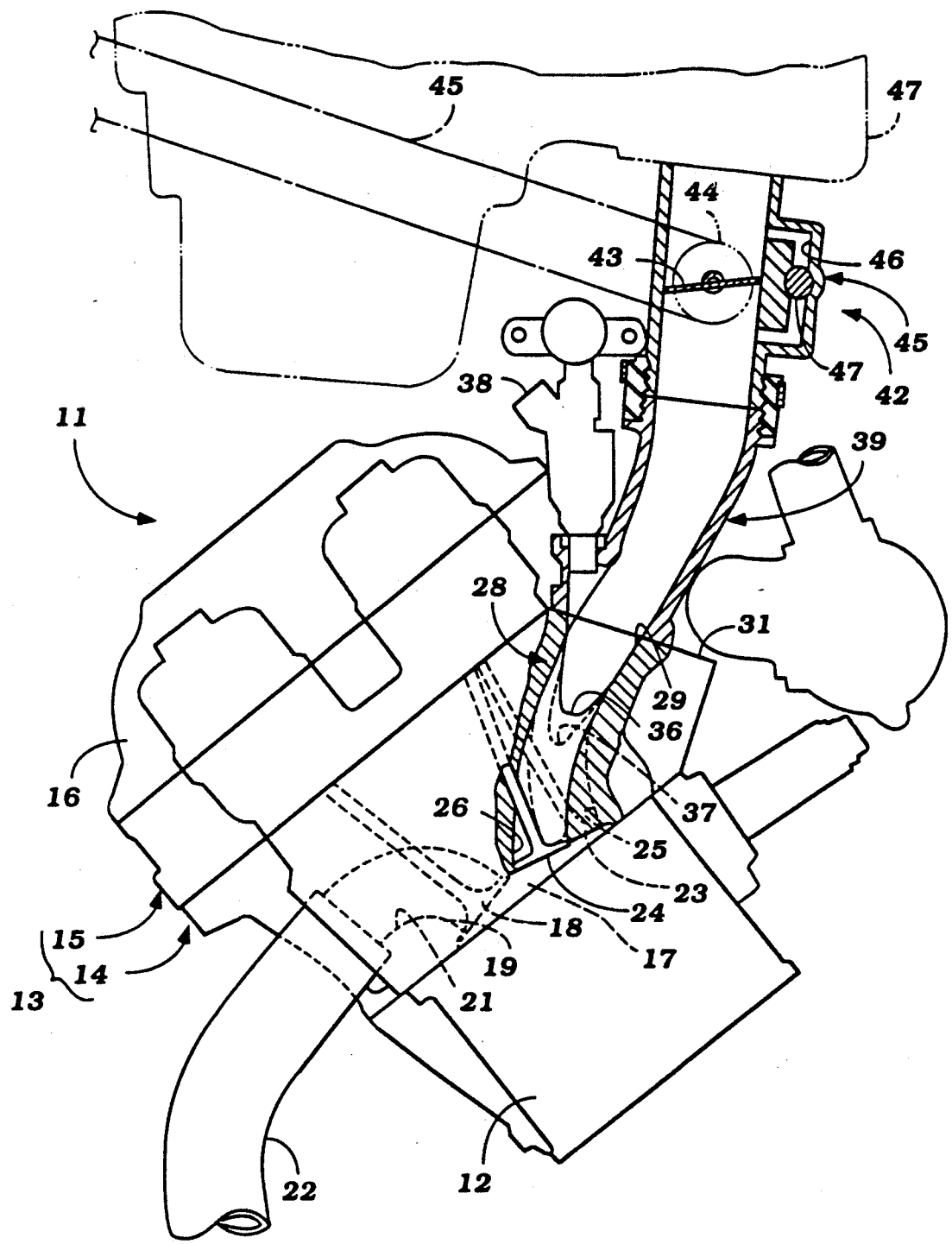
FIG. 1 is a partial side elevational view of an internal combustion engine constructed in accordance with a first embodiment of the invention, with portions broken away and other portions shown in phantom.
Figure 2:
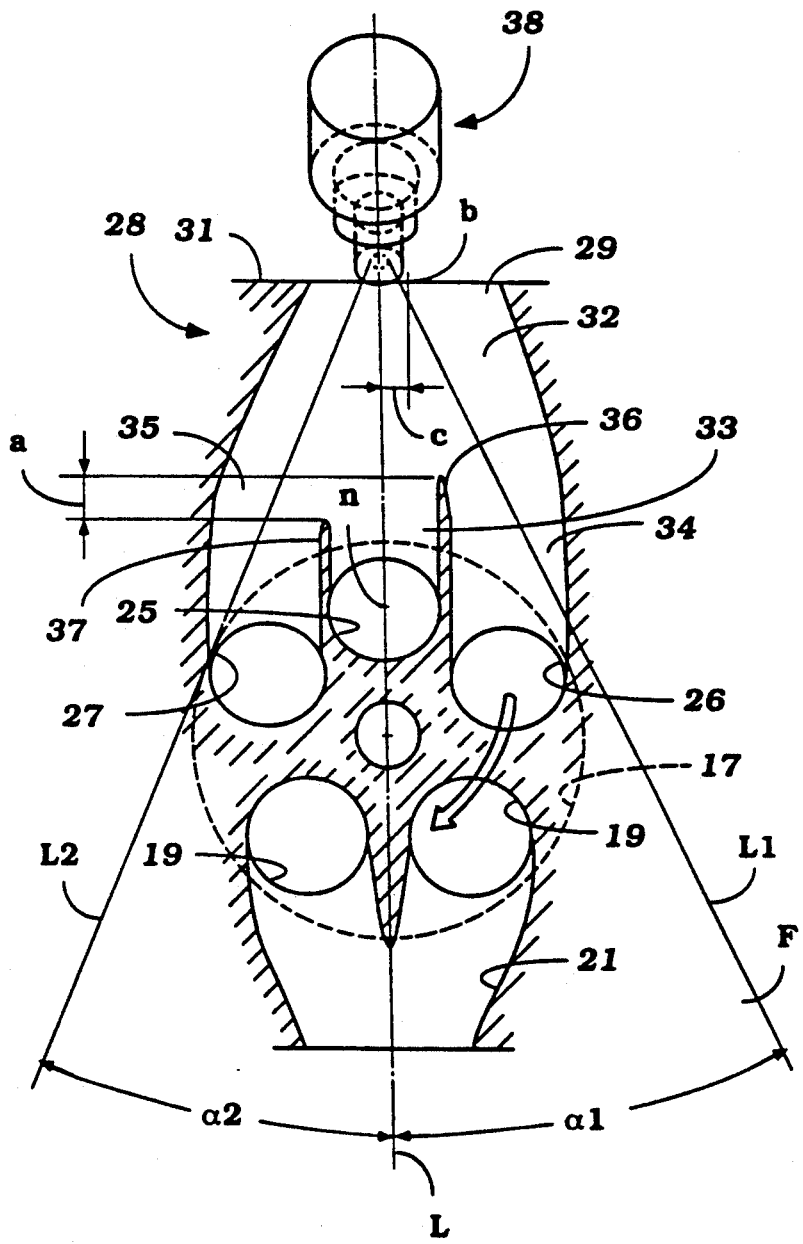
FIG. 2 is a cross sectional view taken through the porting arrangement for a single cylinder of the engine and shows the relationship of the fuel injector and its spray pattern in the ports.
Figure 3:
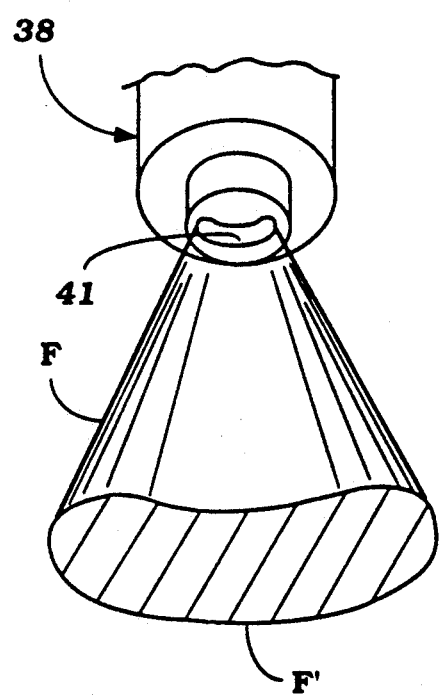
FIG. 3 is a enlarged perspective view showing the spray pattern from the injection nozzle of this embodiment.

Referring first to the embodiment of FIGS. 1 through 3, an internal combustion engine constructed in accordance with this embodiment is identified generally by the reference numeral 11 and is shown partially. FIG. 1 is a side elevational view of the top portion of the engine showing the upper portion of the cylinder block, the cylinder head and induction systems since this the area where the invention resides. Portions of the engine 11 which ar not illustrated or which are not described may be considered to be conventional.

The engine 11 includes a cylinder block 12 which, in the illustrated embodiment, is of the in-line type having a plurality of in-line cylinder bores. Since the engine 11 is, in the illustrated embodiment, adapted for use in a motorcycle application the cylinder block 12 is inclined from the vertical toward the front of the motorcycle. Of course, is should be understood that the invention can be employed in a wide variety of other applications for internal combustion engines and, in engines having other cylinder numbers and cylinder dispositions.

A cylinder head assembly, indicated generally by the reference numeral 13 is affixed to the cylinder block 12 and includes a lower main cylinder head portion 14 and a cam carrier portion 15. A cam cover 16 is affixed to this assemblage and encloses the camshafts driving the valve train of the engine.

The cylinder head 13 and specifically the cylinder head portion 14 is formed with a plurality of recesses 17 in its lower face one aligned with each cylinder bore of the engine and which form with the cylinder bore and pistons the combustion chamber. A pair of exhaust valves, indicated by the reference numeral 18 are supported for reciprocation within the cylinder head assembly 13 on one side of the cylinder bore about axes that are inclined at an acute angle to a plane containing the axis of the cylinder bore. The exhaust valves 18 are operated by an exhaust camshaft journaled by the cam carrier 15 and contained within the cam cover 16. The exhaust valves 18 control the flow through exhaust ports 19 formed at valve seats pressed into the cylinder head portion 14 at the termination of exhaust ports 21. The exhaust ports 21 extend through the exhaust side of the cylinder head 14 and either have separate or common openings that meet with an exhaust manifold 22 that is affixed to the cylinder head 14 in any known manner.

On the opposite side of cylinder head assembly 14, the intake side, there are provided three poppet type intake valves comprised of a center valve 23 which is reciprocally supported about an axis that is inclined at a lesser acute angle to the aforenoted plane containing the axis of the cylinder bore then the exhaust valves 18 and a pair of side intake valves 24 which are disposed at a greater acute angle to this plane then the exhaust valves 18 but which lie at the same acute angle as each other. These intake valves 23 and 24 are operated by a intake camshaft which is supported by the cam carrier 15 and contained within the cam cover 16.

As may be best seen in FIG. 2, the center intake valve 23 cooperates with a center valve seat or valve port 25 that serves the combustion recess 17. The side exhaust valves 24 cooperate with first and second side valve seats or ports 26 and 27 which extend closer to the plane containing the axis of the cylinder bore as best seen in FIG. 2.

A single siamese type intake passage, indicated generally by the reference numeral 28 serves all of the intake ports 25, 26 and 27. This intake passage 28 includes an offset inlet opening 29 formed in an upper surface 31 of the cylinder block portion 14. This inlet opening 29 serves a common passage portion 32 which then divides into a central passage portion 33 and a pair of first and second side passage portions 34 and 35. The center passage portion 33 is separately by the first side passage portion 34 by an internal wall 36 and the center passage portion 33 is separated from the second side passage portion 35 by a wall 37. It should be noted that the wall 36 is substantially longer than the wall 37 a indicated by the dimension a in this figure. This configuration establishes a swirl in the combustion recess 17 when the intake valves are all open as shown by the arrow in FIG. 2. This swirl will be more significant at low speeds than at high speeds.

It has been noted that the center b of the inlet opening 29 of the intake passage 28 is offset from the center n of the center intake port 25 and a line L connecting this center with the center o of the cylinder bore 17. A fuel injector 38 is mounted in an intake manifold 39 which is affixed to the cylinder head surface 31 in an appropriate manner and sprays into the opening 29. The fuel injector 38 has a nozzle portion 41 which provides a spray F having a generally elliptical shape pattern F' that subtends an arc disposed between the lines $L_1$ and $L_2$ and its center is disposed on the line L. It should be noted that the spray from the nozzle port 41 is such that a greater angle $a1$ will be sprayed on the side toward the side intake port 26 then the spray $a2$ on the opposite side toward the intake port 27. This offsetting of the spray is to compensate for the intrusion of the wall 36 into the spray area at a greater distance than the wall 37 so as to insure that there will be substantially equal fuel supplied to all of the intake ports 25, 26 and 27. Also, it should be noted that the spray pattern F is somewhat concave or shape like a sausage in shape so that a greater proportion of the fuel will be sprayed toward the lower portion of the intake passage 28 as should be apparent from FIG. 1 so that more of the fuel will impinge upon the cylinder bore peripheral edges of the intake valves 23 and 24 then on the opposite side. This will insure that there will also be good distribution of the fuel as it is delivered to the cylinder.

A throttle body, indicated generally by the reference numeral 42 is affixed to the upper end of the manifold 39 and is provided with a throttle valve 43 for controlling the flow to the manifold 39. A pulley 44 is affixed to an shaft of the throttle valve 43 and is operated by a wire actuator 45 so as to position the throttle valve 43 and control the speed of the engine.

A cold starting device, indicated generally by the reference numeral 45 is provided on one side of the throttle body 42 and comprises a by-pass passage 46 in which a temperature responsive valve element 47 is positioned. The valve element 47 is adapted to be opened when the temperature is low so as to increase the air flow and idle and speed and promote faster warm up.

Air is supplied to the throttle body 42 from an air induction device 47 which may include a silencing component, a filtering component and a plenum chamber.

Figure 4:
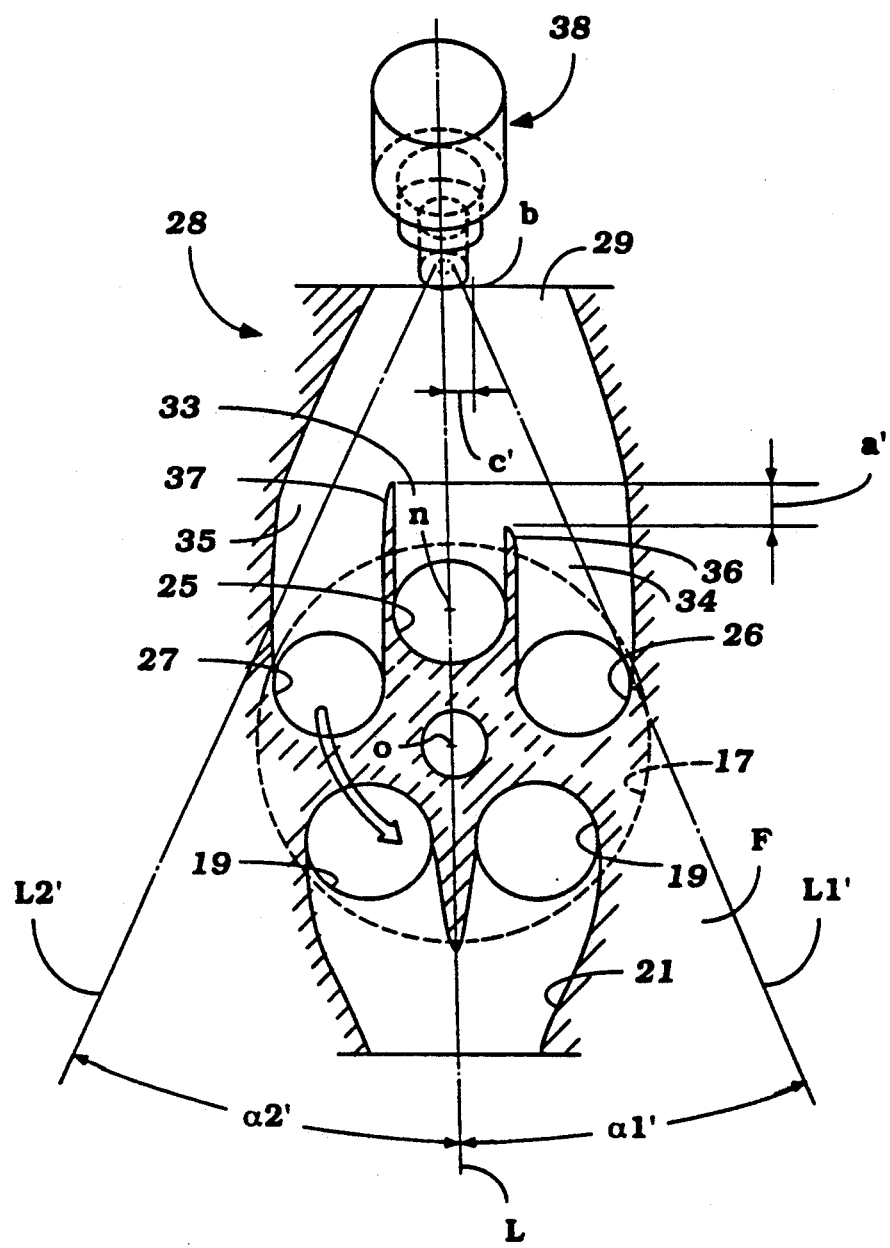
FIG. 4 is a cross sectional view, in part similar to FIG. 2, and shows another embodiment of the invention.

In the embodiment of the invention as thus far described, the swirl of the charge entering the combustion chamber recess 17 was in a clockwise direction as viewed in FIG. 2. FIG. 4 shows another embodiment of the invention, which is the same as the embodiment of FIG. 2 but wherein the swirl is accomplished in the opposite direction (counter clockwise). This is accomplished by lengthening the wall 37 relative to the wall 36 in the opposite direction as in the previously described embodiment. In this embodiment, therefore, the offset distance indicated at a' between the walls 36 and 37 promotes a faster velocity in the passage portion 35 and through the port 27 so as to create a swirl in this direction.

For a similar reason as with the previously described embodiment, the spray port from the injector 38 is configured so as to provide a greater flow between the center line L and the port 27 then between the center line and the port 26. Hence, the angle $a_2'$ is greater than the angle $a_1'$ so as to cause the arc L2' to be greater than the arc L1' to achieve the aforenoted uniform fuel flow between all passages. Because this is the only difference from the previously described embodiment, components which are the same have been identified by the same reference numerals.

Figure 5:
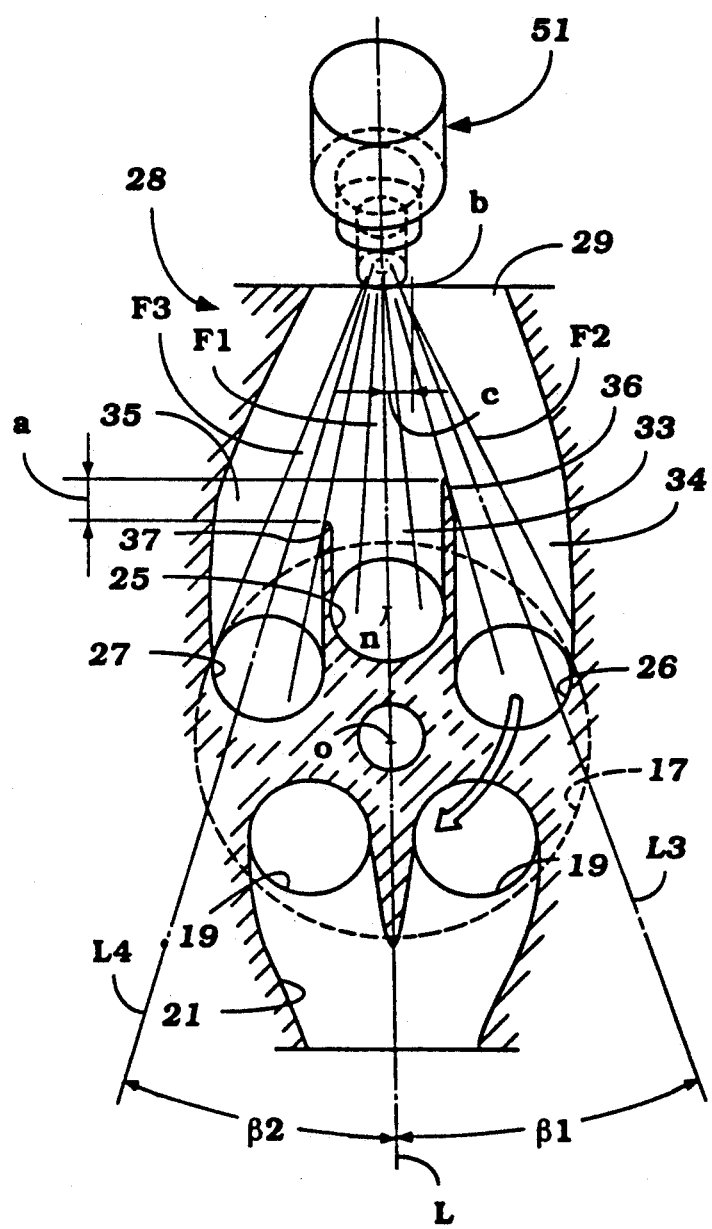
FIG. 5 is a cross sectional view, in part similar to FIGS. 2 and 4, and shows yet another embodiment of the invention.
Figure 6:
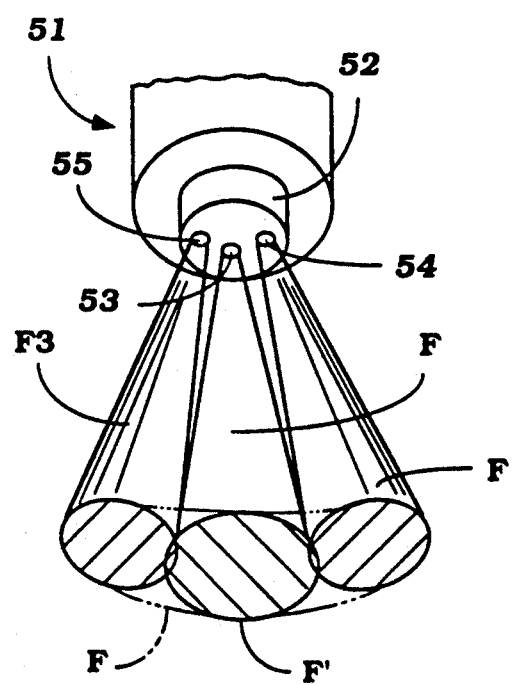
FIG. 6 is a perspective view, in part similar to FIG. 3, and shows the spray pattern of the fuel injection nozzle of the embodiment of FIG. 5.

FIGS. 5 and 6 show another embodiment of the invention which is generally the same as the embodiment of FIGS. 1 through 3 except that the fuel injector has a different nozzle configuration. Because this is the only difference from the previously described embodiment, this element is the only one which will be described in detail and the components which are the same have been identified by the same reference numerals and will be described again in detail only insofar as is necessary to understand the construction and operation of this embodiment.

In this embodiment, a fuel injector 51 has a spray nozzle portion 52 that is provided with three discharge ports a center discharge port 53, a first side discharge port 54 and a second side discharge port 55. These discharge ports have the spray patterns F1, F2 and F3 respectively as shown in the figures. It will be seen that a generally oval overall spray pattern results which is also curved like a sausage as with the previously described embodiment. However, the spray is made up of three ellipses super-imposed in part on each other so as to provide the desired flow pattern.

The spray pattern is disposed so that the nozzle port 54 has its center line L3 disposed at an angle B1 to the center line L while the nozzle port 55 has its center spray line L4 disposed at a smaller angle $\beta 2$ to this center line. As a result, and like the previously described embodiments, there will be a greater flow toward the more obstructed side intake port and hence there will be a uniform flow of fuel through all of the intake ports 25, 26 and 27.

Figure 7:
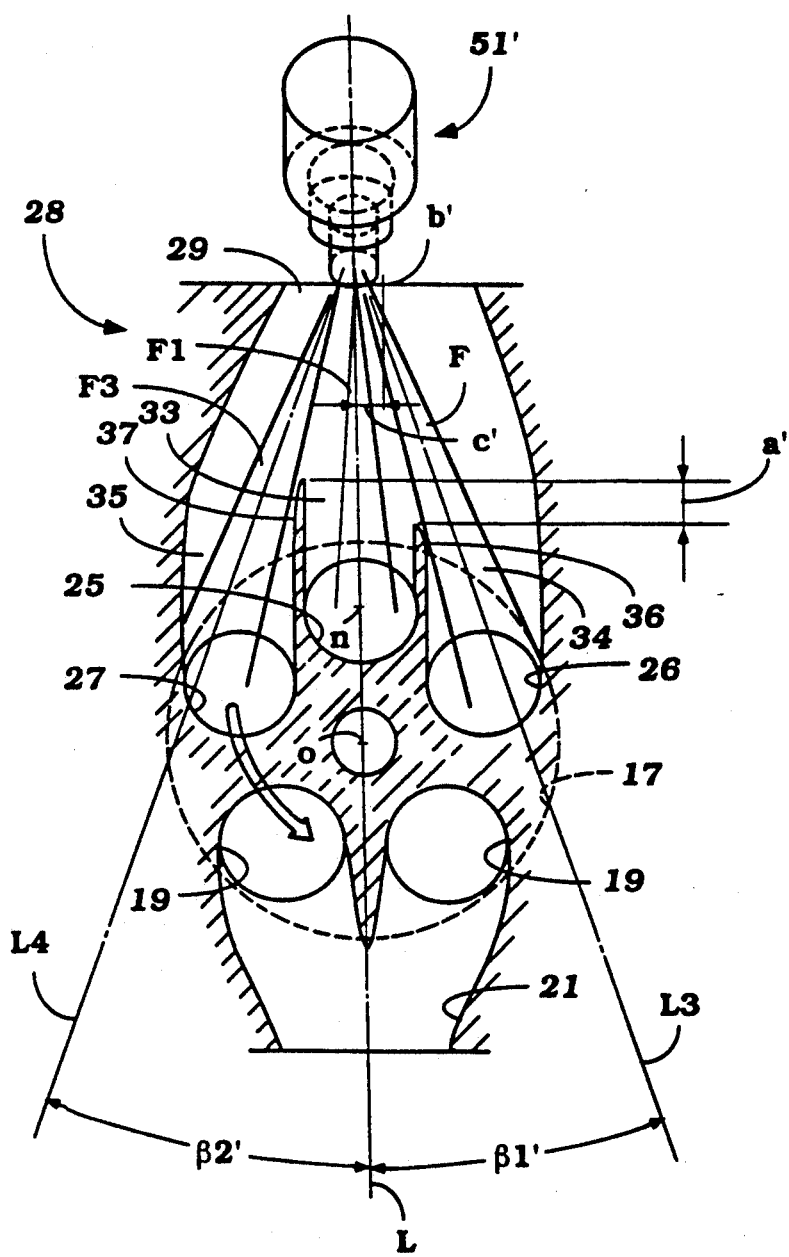
FIG. 7 is a cross sectional view, in part similar to FIGS. 2, 4 and 5, and shows yet another embodiment of the invention.

FIG. 7 shows another embodiment of the invention using a spray nozzle of the type shown in FIGS. 5 and 6 but a counter clockwise rather then clockwise swirl is shown in the embodiment of FIG. 4. It should be readily apparent to those skilled in the art that this is accomplished by rearranging the spray nozzles 54 and 55 so that the nozzle 54 has its center line spaced a greater distance $\beta 2'$ from the plane L then the spray from the nozzle port 55 which is shown at $\beta 1'$.

It should be readily apparent from the foregoing descriptions that the described arrangements provide a amount of swirl to a three port engine have a siamese induction passage with equal fuel flow to all of the intake ports being derived from a single fuel injector. Although a number of embodiments of the invention are illustrated and described, various changes and modifications may be made without departing from the spirit and scope of the invention, as defined by the appended claims.

We claim:

1. An induction system for an internal combustion engine having a combustion chamber, three intake ports serving said combustion chamber comprised of a center intake port and first and second side intake ports lying on opposite sides of said center intake port, intake passage means having a common portion separated into three outlet portions, a center outlet portion and a pair of side outlet portions, each serving a respective one of said intake ports, a first of said side portions being longer than the second of said side portions, and a fuel injector for spraying fuel into the common portion of said intake passage means toward said outlet portions, said fuel injector being disposed to spray more fuel toward said first side portion than said second side portion to promote uniform fuel flow through all of said intake ports.

2. An induction system as set forth in claim 1 wherein the first side portion is configured so as to generate a swirl to the intake charge.

3. An induction system as set forth in claim 1 wherein the center intake passage portion is separated by the side intake portions by first and second walls, respectively, with the first wall being longer than the second wall.

4. An induction system as set forth in claim 3 wherein the first side portion is configured so as to generate a swirl to the intake charge.

5. An induction system as set forth in claim 1 wherein the fuel injector sprays in an elliptical shape pattern with the center of the ellipse lying along a line passing through the center of the center intake port and one side of the ellipse extending at a greater angular distance toward the first side intake passage than the other side of the ellipse which extends toward the second side intake passage.

6. An induction system as set forth in claim 5 wherein the center of the common intake port passage portion is offset toward the first side intake port.

7. An induction system as set forth in claim 6 wherein the elliptical shaped spray has its major axis curved so as to spray more fuel toward the lower sides of the intake valves than the upper sides.

8. An induction system as set forth in claim 6 wherein the center intake passage portion is separated by the side intake portions by first and second walls, respectively, with the first wall being longer than the second wall.

9. An induction system as set forth in claim 8 wherein the first side portion is configured so as to generate a swirl to the intake charge.

10. An induction system as set forth in claim 5 wherein the spray pattern is formed by a plurality of spray nozzles comprised of a center spray nozzle and first and second side spray nozzles.

11. An induction system as set forth in claim 10 wherein the first of the side spray nozzles has its center of spray at a greater angle than the other of the side spray nozzles relative to the center spray nozzle.

12. An induction system as set forth in claim 11 wherein the center of the common intake port passage portion is offset toward the first side intake port.

13. An induction system as set forth in claim 12 wherein the center intake passage portion is separated by the side intake portions by first and second walls, respectively, with the first wall being longer than the second wall.

14. An induction system as set forth in claim 13 wherein the first side portion is configured so as to generate a swirl to the intake charge.

15. An induction system as set forth in claim 12 wherein the elliptical shaped spray has its major axis curved so as to spray more fuel toward the lower sides of the intake valves than the upper sides.

16. An induction system as set forth in claim 1 wherein the common portion of the intake passage means extends from a single opening formed in an external surface of a cylinder head which forms in part the combustion chamber and in which the intake ports and intake passage means are formed.

17. An induction system as set forth in claim 16 wherein the first side portion is configured so as to generate a swirl to the intake charge.

18. An induction system as set forth in claim 16 wherein the center intake passage portion is separated by the side intake portions by first and second walls, respectively, with the first wall being longer than the second wall.

19. An induction system as set forth in claim 18 wherein the first side portion is configured so as to generate a swirl to the intake charge.

20. An induction system as set forth in claim 16 wherein the fuel injector sprays in an elliptical shape pattern with the center of the ellipse lying along a line passing through the center of the center intake port and one side of the fan extending at a greater angular distance toward the first side intake passage than the other side of the ellipse which extends toward the second side intake passage.

21. An induction system as set forth in claim 20 wherein the center of the common intake port passage portion is offset toward the first side intake port.

22. An induction system as set forth in claim 21 wherein the elliptical shaped spray has its major axis curved so as to spray more fuel toward the lower sides of the intake valves than the upper sides.

23. An induction system as set forth in claim 21 wherein the center intake passage portion is separated by the side intake portions by first and second walls, respectively, with the first wall being longer than the second wall.

24. An induction system as set forth in claim 23 wherein the first side portion is configured so as to generate a swirl to the intake charge.

25. An induction system a set forth in claim 20 wherein the spray pattern is formed by a plurality of spray nozzles comprised of a center spray nozzle and first and second side spray nozzles.

26. An induction system as set forth in claim 25 wherein the first of the side spray nozzles has its center of spray at a greater angle than the other of the side spray nozzles relative to the center spray nozzle.

27. An induction system as set forth in claim 26 wherein the center of the common intake port passage portion is offset toward the first side intake port.

28. An induction system as set forth in claim 27 wherein the center intake passage portion is separated by the side intake portions by first and second walls, respectively, with the first wall being longer than the second wall.

29. An induction system as set forth in claim 28 wherein the first side portion is configured so as to generate a swirl to the intake charge.

30. An induction system as set forth in claim 27 wherein the elliptical shaped spray has its major axis curved so as to spray more fuel toward the lower sides of the intake valves than the upper sides.

* * * * *